UNITED STATES PATENT OFFICE.

JAMES H. STEBBINS, JR., OF NEW YORK, N. Y.

IMPROVEMENT IN COLORING-MATTERS OBTAINED FROM CRESOL.

Specification forming part of Letters Patent No. 221,117, dated October 28, 1879; application filed April 23, 1879.

*To all whom it may concern:*

Be it known that I, JAMES H. STEBBINS, Jr., of the city, county, and State of New York, have invented a new and useful Improvement in Coloring - Matters, which improvement is fully set forth in the following specification.

This invention relates to a coloring-matter which I term "cresolidine," and which is obtained by the reaction of diazo-benzole nitrate on cresol.

In carrying out my invention I heat an alkaline solution of cresol with an aqueous solution of diazo-benzole nitrate, using about equal molecules of cresol and diazo-benzole nitrate. When these solutions are brought together, a red - yellow liquid is formed, which is gently warmed for a short time. On cooling, crystals of a brown color make their appearance, which are collected on a filter and dried.

These crystals form my new coloring-matter, which dissolves readily in alcohol, imparting to the same a yellow color. It is insoluble in water; but by converting it into the potash salt it becomes soluble in boiling water.

It may also be converted into its sulpho-salt either by first producing the sulpho - acid of cresol and treating such with diazo-benzole nitrate, or by forming the yellow crystals in the manner above described and converting these into the sulpho-salt.

Silk mordanted with muriate of tin and dipped into the alcoholic solution of cresolidine is dyed of a fine orange. Wool is dyed yellow with or without mordants.

What I claim as new, and desire to secure by Letters Patent, is—

As a new manufacture, the coloring-matter or dye-stuff obtained from the reaction of diazo-benzole nitrate on cresol, substantially in the manner set forth, or by any other method which will produce a like result.

In testimony that I claim the foregoing I have hereunto set my hand and seal this 19th day of April, 1879.

JAMES H. STEBBINS, JR. [L. S.]

Witnesses:
    W. HAUFF,
    E. F. KASTENHUBER.